J. A. MOORE.
PEA VINE GATHERER.
APPLICATION FILED DEC. 6, 1912.
1,059,898.
Patented Apr. 22, 1913.
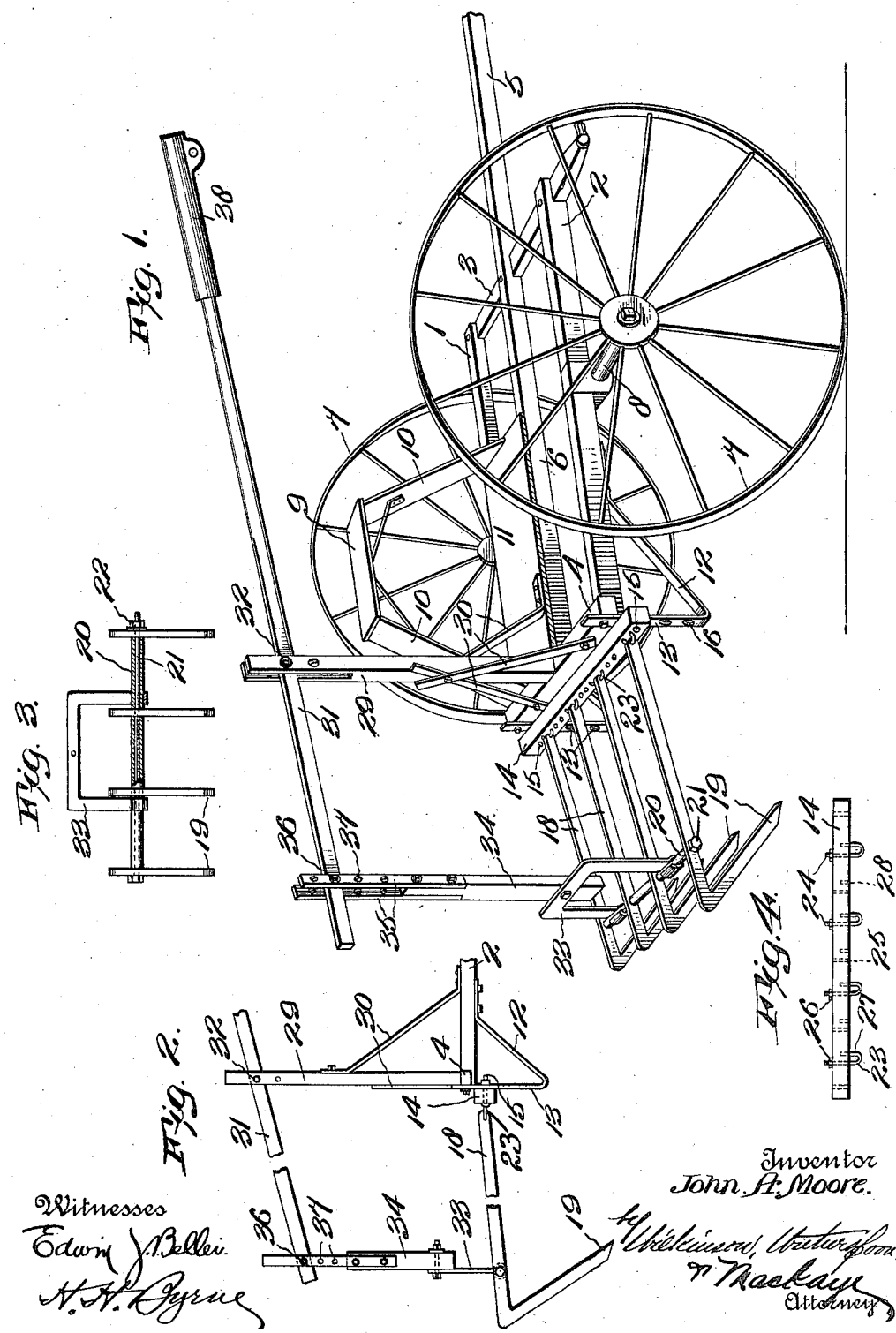
Inventor
John A. Moore.

UNITED STATES PATENT OFFICE.

JOHN A. MOORE, OF FRANKLIN, LOUISIANA.

PEA-VINE GATHERER.

1,059,898. Specification of Letters Patent. Patented Apr. 22, 1913.

Application filed December 6, 1912. Serial No. 735,299.

*To all whom it may concern:*

Be it known that I, JOHN A. MOORE, a citizen of the United States, residing at Franklin, in the parish of St. Mary and State of Louisiana, have invented certain new and useful Improvements in Pea-Vine Gatherers; and I do hereby declare the following to be a full, clear, and exact description of the invention, such as will enable others skilled in the art to which it appertains to make and use the same.

The present invention relates to dumping rakes of that type designed to be carried by horse driven vehicles, especially to the type known as pea vine gatherer, and has for its purpose to provide a device of that character which will effectively gather the vines and permit of their being dumped in piles convenient for further handling; and wherein the same may be readily controlled and operated by the driver of the vehicle.

The invention has for its further purpose to provide a dumping rake, or vine gatherer, which will be of simple and durable construction, and one which can be manufactured at comparatively small cost; and wherein the construction and manner of assembling the several parts is such that the same may be readily assembled and disassembled without requiring any special skill.

With these and other objects in view the invention consists in the novel details of construction and combinations of parts more fully hereinafter disclosed and particularly pointed out in the claim.

Referring to the accompanying drawings forming a part of this specification in which like numerals designate like parts in all the views:—Figure 1 is a perspective view of the dumping rake, or vine gatherer; Fig. 2 is a side elevational view of the rake *per se* and its immediately associated parts; Fig. 3 is a rear elevational view of the rake, and shows in section the means for securing the bars of the rake in spaced relation; and Fig. 4 is a top plan view of the beam showing the means for connecting the bars of the rake thereto.

Referring to the construction in detail, the invention comprises a suitable vehicle having a body frame constructed of side members 1 and 2, end members 3 and 4, and a shaft 5 whose continuation 6 provides a middle bar. Wheels 7 are mounted on an axle 8, suitably secured to the vehicle body, and a driver's seat 9 is mounted on supports 10 secured to the platform 11.

The construction of vehicle described in the foregoing may be of any other suitable type, and for which reason forms no part of the present invention.

A pair of metal bars, or brackets 12 of angle iron construction are secured to the side pieces 1 and 2 and the cross piece 4, and provide a pair of vertical supporting members 13 on which is adjustably mounted a beam 14 through the medium of suitable bolts 15, or in any other approved manner. The supporting members 13 are provided each with a plurality of apertures 16, to the end that the beam 14 may be adjustably secured thereon accordingly as the rake is to be used at a greater or less distance from the ground. A plurality of bars 18 are secured to the beam 14, and are adapted to trail therefrom. Said bars have their rear ends downwardly and inwardly disposed to provide teeth 19, and the teeth of the several bars are secured in spaced relation through the medium of a plurality of sleeves 20 disposed between the bars, and a rod 21 passes through the several bars and the sleeves, and is secured through the medium of a nut 22 screw-threaded thereon. The connection between the teeth bars and the beam 14 consists of a plurality of staples 23, having each an extended and threaded portion 24, which passes through an aperture in the beam and is provided with a nut 26 for securing the same. The shorter portion 27 of each staple fits within a recess or opening 28, which extends only partially through the beam, as in the manner shown in Fig. 4.

With the bars of the rake connected as in the manner just described, the individual bars thereof are permitted to have slight independent movement, and the rake as a whole will itself conform to the surface of the ground over which the vehicle is passing. Also the provision of having the bars of the rake detachably connected to the beam permits of the number of bars in the rake being varied. In the construction shown, four bars are shown, and it will be clearly seen from an inspection of Fig. 4, that a greater number of bars could with convenience be used.

An upright support consisting of a post or beam 29 is mounted on the vehicle body and reinforced by suitable braces 30, and has its upper end bifurcated to receive the rake controlling or manipulating arm 31. Said arm fits within the bifurcation of the support and is fulcrumed on a bolt 32, which bolt is adapted to be secured in different positions on the support accordingly as the rake beam 14 is adjusted on its supports 13.

The rake controlling arm is connected to the rake through the medium of a yoke 33, that is secured to a pair of the spacing members 20, and a lifting bar 34. The bar 34 has secured thereto at its supper end a pair of members 35, between which is received the rear end of the arm 31, and said arm is adjustably connected thereto through the medium of a bolt 36 adapted to pass through any pair of the apertures 37 formed in said members 35. The forward end of the arm 31 is provided with a counterbalancing weight 38, which enables of the rake being readily controlled by the hand of the driver, as will be understood.

It is obvious that those skilled in the art may vary the details of construction and arrangement of parts without departing from the spirit of my invention, and therefore I do not wish to be limited to such features except as may be required by the claim.

What I claim is:—

In a dumping rake, the combination of a vehicle; a pair of angle bars secured to the vehicle and providing vertical supporting members; a beam adjustably mounted on said supporting members; a plurality of staples removably secured to said beam; a bar providing a tooth loosely connected to each of said staples and trailing therefrom; sleeves disposed between said bars; a shaft passing through the several bars and sleeves and securing said bars in spaced relation; an upright support mounted on the vehicle and having its upper end bifurcated; an arm fitting within said bifurcation and adjustably mounted on the support; a yoke connected to a pair of said spacing sleeves; a lifting bar connected to said yoke and having adjustable connection with the rear end of said fulcrumed arm; and a counterbalancing weight mounted on the forward end of said arm, substantially as described.

In testimony whereof, I affix my signature, in presence of two witnesses.

JOHN A. X MOORE.
his mark

Witnesses:
P. F. DUMESNILS,
CHAS. LOWE.

---

Copies of this patent may be obtained for five cents each, by addressing the "Commissioner of Patents, Washington, D. C."